Jan. 18, 1949.　　　　O. H. OLEEN　　　　2,459,580
ANIMAL TRAP
Filed Aug. 20, 1946
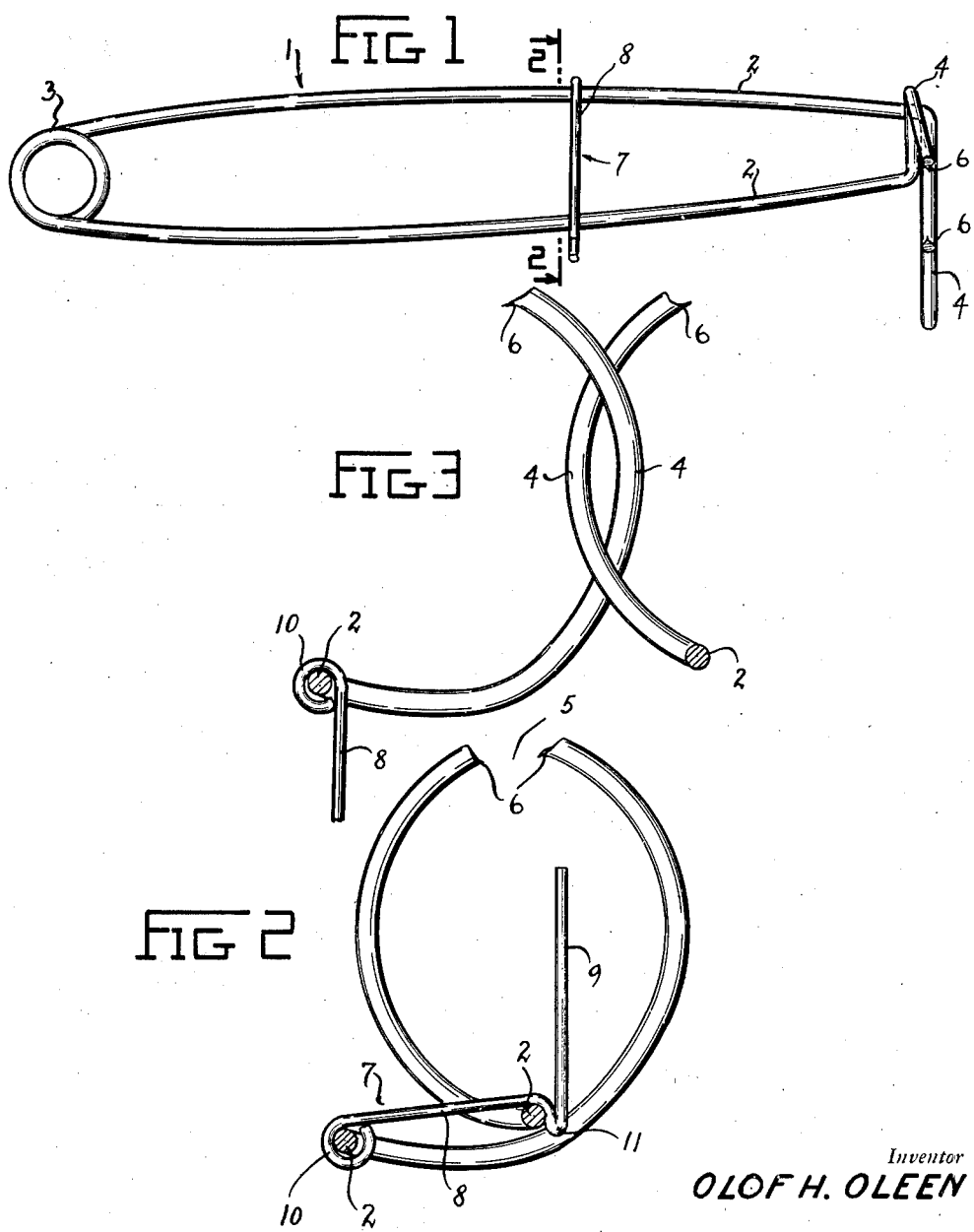
Inventor
OLOF H. OLEEN
By Clarence A. O'Brien
and Harvey B. Jacobson
Attorneys Patented Jan. 18, 1949

2,459,580

UNITED STATES PATENT OFFICE 2,459,580

ANIMAL TRAP

Olof H. Oleen, St. Helens, Oreg.

Application August 20, 1946, Serial No. 691,714

1 Claim. (Cl. 43—85)

My invention relates to improvements in animal traps for rodents, especially moles, gophers, and the like.

The primary object of the invention is to provide a simple form of highly efficient trap for insertion in the mouth of holes or burrows made by rodents, and which is adapted to be sprung by the rodent attempting to issue out of the mouth of the hole, or burrow, and when sprung to render the animal helpless, and/or kill the same.

Another object is to provide a trap of the character and for the purpose above set forth which may be so cheaply manufactured that it may be disposed of with a rodent caught therein without loss of any consequence compared with the advantage gained.

Other and subordinate objects, also comprehended by my invention, together with the precise nature of my improvements and the advantages thereof, will be readily understood when the succeeding description and claims are read with reference to the drawing accompanying and forming part of this specification.

In said drawings:

Figure 1 is a view in plan illustrating my improved animal trap in a preferred embodiment thereof.

Figure 2 is a view in transverse section taken on the line 2—2 of Figure 1 and drawn to a larger scale.

Figure 3 is a view similar to Figure 2 and illustrating the manner in which the jaws are adapted to interlap when the trap is sprung.

Referring to the drawing by numerals, my improved animal trap in the illustrated, preferred embodiment thereof, has the form of an elongated clasp formed of a single piece of resilient rod material, such as spring steel wire of heavy gauge, and which is bent upon itself to provide a pair of opposed, spaced apart side arms 2 connected together at one end by a coil spring 3 acting to spread said side arms apart. At the other ends of the same, said side arms 2 terminate in a pair of lateral, oppositely curved, arcuate jaws 4 forming bent extensions of said side arms 2 on one and the same side of the trap and adapted to be separated into open position by flexing of the side arms 2 toward each other into a set position, all as shown in Figures 1 and 2. As will be noted in Figure 2, the jaws 4 when open form a substantially broken ellipse with a gap 5 between the free ends thereof. The free ends of the jaws 4 are adapted, by sharpening, to form impaling tips 6 on said jaws. As best shown in Figure 3, the jaws 4 are arranged to lie in relatively angular planes so that the same will cross each other in interlapping relation to limit the spreading of the side arms 2.

A catch 7 is provided for maintaining the side arms 2 set against spreading apart, and the jaws 4 open. The catch 7 is formed from a single piece of rigid wire bent upon itself to provide a bridging arm 8 adapted to extend crosswise of the side arms 2, and a straight arm 9 adapted to extend laterally of the side arms 2 on the same side thereof as the jaws 4 and in the same manner as said jaws. The arm 8 terminates in an eye 10 loosely surrounding one side arm 4 so that the catch 7 is slidable and freely swingable on said side arm. At the juncture of said arms 8, 9, the catch is formed with a lateral loop comprising a hook 11 for catching over the other side arm 2.

To set the described trap, the side arms 2 are set by flexing toward each other and the catch 7 is then swung on the side arm 2 on which it is mounted, across the other side arm 2 with the hook 11 caught over said other side arm 2. Thus the side arms 2 are maintained set against separation, and the jaws 4 are set into open position. With the latch 7 swung to apply the same, as described, the arm 9 of said latch extends at a substantial right angle to one side arm 2, on the same side as the jaws 4. In applying the latch 7, the same is first slid toward the jaws 4 into a position such that a rodent entering in between the jaws 4 will contact the arm 9 before it clears said jaws. With the trap set as described, it is inserted, the jaws 4 foremost, into a rodent hole, or burrow, not shown. A rodent issuing out of the hole, or burrow, is forced to pass between the open jaws 4 and when substantially half way past said jaws is forced to contact the arm 9 of the latch 7, thereby rocking said latch on the side bar 2, on which it is mounted, so that the hook 10 is canted into a position for releasing the side bar 2 over which it was positioned. As soon as the latch 7 is thus rocked and the hook 10 canted into the position described, the side arms 2 spring apart and thus separate to move the jaws 4 toward each other to clamp the rodent therebetween and force the impaling tips 6 into the rodent. Thus the rodent is caught, to expire, or be disposed of as desired.

As will be noted, the described trap is formed of two parts only, both of which are readily obtainable and may be pre-formed at a very low cost, and the parts will not readily get out of order nor break and render the trap useless. Also, the trap may be easily and quickly set with safety and is adapted to be positioned in a rodent hole, or burrow, quickly and easily.

The foregoing will, it is believed, suffice to impart a clear understanding of my invention without further explanation.

Manifestly, the invention, as described, is susceptible of modification without departing from the inventive concept, and right is herein reserved to such modifications as fall within the scope of the appended claim.

What I claim is:

A rodent trap comprising a pair of side arms, a spring connecting said arms together at one end thereof and tending to spread said arms apart, a pair of arcuate rigid jaws on the other ends of said arms extending laterally therefrom in opposed oppositely curving relation and in substantially right angular relation thereto for movement toward each other by spreading of said side arms to clampingly engage a rodent passing between the same, said jaws being crossed for interlapping relation to limit spreading movement of said side arms, and a latch arm swingable on one side arm across the other side arm with a terminal hook for engaging over said other side arm to prevent said side arms from spreading apart, said latch arm being swingable into releasing position and being provided with a right angled latch swinging arm on said hook for contact by the rodent while the rodent is between said jaws.

OLOF H. OLEEN.

REFERENCES CITED

The following references are of record in the file of this patent:

UNITED STATES PATENTS

| Number | Name | Date |
| --- | --- | --- |
| 619,175 | Heda | Feb. 7, 1899 |
| 1,143,589 | Ricker | June 15, 1915 |
| 1,981,785 | Donadei | Nov. 20, 1934 |
| 1,998,521 | Pickering, Jr. | Apr. 23, 1935 |